United States Patent [19]

Miyauchi

[11] 4,202,603
[45] May 13, 1980

[54] REMOTELY CONTROLLED MIRRORS

[75] Inventor: Shizuya Miyauchi, Shizuoka, Japan

[73] Assignee: Koito Manufacturing Company Limited, Tokyo, Japan

[21] Appl. No.: 904,754

[22] Filed: May 11, 1978

[30] Foreign Application Priority Data

May 31, 1977 [JP] Japan .................................. 52-63516
May 15, 1978 [JP] Japan ........................... 53-32883[U]

[51] Int. Cl.² ............................................... G02B 7/18
[52] U.S. Cl. .................................................... 350/289
[58] Field of Search ........................................ 350/289

[56] References Cited

U.S. PATENT DOCUMENTS 3,609,014  9/1971  Kurz ...................................... 350/289
3,972,597  8/1976  Repay et al. .......................... 350/289

Primary Examiner—Jon W. Henry

Attorney, Agent, or Firm—Charles E. Pfund

[57] ABSTRACT

A back plate carrying a mirror is mounted on a stationary base plate through a universal support to be rotatable and filtable. Two threaded rods are connected to the back plate through couplings that rotate and tilt the back plate. The threaded rods each have ends connected to worm wheels respectively which mesh worms driven by one or two reversible direct current motors. A spring having a single turn at the center is used. The single turn portion is secured to the base plate and the opposite legs are urged against the threaded rods act as nuts so as to move the threaded in the axial direction when they are rotated where two worms are driven by a single reversible direct current motor, the worms disposed on the opposite sides of the motor and selectively connected thereto through clutches which are controlled by a solenoid.

16 Claims, 17 Drawing Figures

REMOTELY CONTROLLED MIRRORS

BACKGROUND OF THE INVENTION

This invention relates to a remotely controlled mirror, for example an outside mirror which is located remotely from a driver of a vehicle such that it is impossible for the driver to adjust the inclination angle of the mirror surface, and more particularly to the driving device of such mirror.

The outside mirror of a vehicles is used to provide for the driver the rear and side views and assures safeness when the vehicle is turned to the left or right or outruns another vehicles. For this reason, before driving a motor car the driver adjusts the angle of the outside mirror such that he can see the side and rear views from the drivers seat. However, such outside mirror is located remote from the driver, for example on a fender so that the driver must get off the car and then adjust the mirror by remembering the view which he saw before adjustment after returning to the drivers seat. If the adjustment is not satisfactory he must adjust again.

Since the adjustment of the outside mirror is troublesome, remotely controlled mirrors have been developed recently.

In order to manufacture such remotely controlled mirrors on the mass production basis, the following facts should be taken into consideration. More particularly, the mirror can be readily and accurately adjusted, the construction should be simple and can be manufactured with minimum number of component parts and at low cost, can prevent overload of the operating motor, can readily adjust the inclination angle of the mirror by hand when desired, erroneous operation would not be caused by vibration or shock, and the mirror should be durable. However, various remotaly controlled side mirrors that have been proposed in the past can not fullfill all of these requirements.

For example, the mirror disclosed in Arthur W. Kurz U.S. Pat. No. 3,609,014 dated Sept. 28, 1971 utilizes a three point pivotal connection supporting construction wherein the central pivot connection is fixed so as to permit angular movement of the mirror thereabout, while the other two pivot connection are spaced from the central pivot connections. The latter pivot connections are connected to power means through worm gears and threaded nuts, and constructed such that the mirror can be angularly adjusted about the center pivot by selectively operating the power means.

With this construction, the threaded studs or nuts constituting the latter two pivot connections are pivotally coupled to a supporting plate that supports the mirror but coupled with the worm gears through screw threads so that as the inclination angle of the mirror surface increases a undue force is applied to the thread couplings with the result that the power means for driving the worm gears becomes overloaded thus damaging the same. Such problem limits the angle of inclination of the mirror. This patent also discloses an arrangement wherein the threaded nuts coupled with the threaded studs are replaced by nuts having not threaded bores and a hair pin like spring members are inserted into the slots provided for the nuts to engage the threaded studs. However, since the hair pin like spring is not sufficiently strong it is impossible to transmit large torque to the threaded nuts.

In another example disclosed in Laszlo, N. Repay U.S. Pat. No. 3,978,735 dated Sept. 7, 1976 a single motor is combined with a clutch mechanism. With this construction where it is desired to adjust the inclination angle of the mirror beyond a limit or to manually adjust the inclination angle the driving motor is overloaded and other elements are also subjected to undue forces. Accordingly, for the purpose of avoiding these problems a slip mechanism is interposed between an adjusting screw connected to the back plate of the mirror and worm driven nuts.

However, the slip mechanism utilized in said patent is made up of a number of component element so that its construction is complicated. To provide a slip, a threaded insert having a plurality of teeth is used but with this construction as the number of slips increases the slots of the threaded rod utilized to transmit torque would be damaged. Thus, this construction is not satisfactory from the standpoint of cost and durability.

SUMMARY OF THE INVENTION

Accordingly, it is the principal object of this invention to provide a novel remotely controlled mirror that can be driven without overloading a drive source, can be manually adjusted its inclination angle to any desired value, and has simple construction involving a reduced number component parts, thus decreasing the cost and improving durability.

Further, another object of the present invention is to provide a remotely controlled mirror in which a spring means is provided with a desired spring force to engage with threaded rods which are adapted to incline the mirror.

According to this invention there is provided a remotely controlled mirror comprising a stationary base plate contained in a mirror housing; a back plate provided at the back of a mirror and provided with a supporting mechanism that can tilt in any direction with respect to the base plate; a pair of threaded rods with one ends rotatably and tiltably connected to the base plate; spring means with one end thereof being supported by the base plate and engaging with the threaded of the threaded rods while the other end being free, thereby controlling axial movement thereof; means for limiting the axial movement of the spring means that is caused by the rotation of the threaded rods engaging with spring member; a pair of worm wheels respectively having openings for receiving the other ends of the threaded rods; a pair of worms meshing the worm wheels respectively; and a source of drive respectively rotating the worms; the openings of the worm wheels and the other ends of the threaded rods being constructed such that it is possible to transmit a torque therebetween but absorb stresses caused by the inclination of the mirror and acting between the worms and worm wheels, and the threaded rods being rotated and moved in the axial direction with respect to the spring means by the torque applied thereto from the source of drive through the worm wheels.

According to a modified embodiment of this invention there is provided a remotely controlled mirror comprising a stationary base plate contained in a mirror housing; a back plate provided at the back of a mirror and provided with a supporting mechanism that can tilt in any direction with respect to the base plate; a pair of threaded rods extending along the axes of rectangular coordinates having an origin at the supporting mechanism one ends of the threaded rods being tiltably supported by the base plate; a spring member having a central portion fixed to the base plate and a pair of legs adapted to engage the threads of the threaded rods for applying spring force thereto so as to control the axial movement of the threaded rods when they are rotated; two worm wheels respectively having openings to receive the other ends of the threaded rods; worms respectively meshing the worm wheels, and a source of drive for selectively driving the worms, the openings of the worm wheels and the other ends of the threaded rods being shaped such that torques can be transmitted therethrough but can prevent creation of stress between the worm wheels and the other ends of the threaded rods when the mirror is inclined so that the threaded rods are rotated and moved in the axial direction by the rotation of the worm wheels.

According to still another embodiment of this invention there is provided a remotely controlled mirror comprising a stationary base plate contained in a mirror housing, a back plate provided at the back of a mirror and provided with a supporting mechanism that can tilt in any direction with respect to the base plate, a pair of threaded rods with one ends rotatably and tiltably connected to the base plate and extending along X and Y axes of rectangular coordinates having an origin at the supporting mechanism, a spring member having a central portion secured to the base plate and the opposite ends engaged the threads of the threaded rods thus applying a spring force thereto, means for preventing the axial movement of the threaded rods when they are rotated; a pair of worm wheels respectively having openings for receiving the other ends of the threaded rods, worms disposed at right angles and respectively meshing the worm wheels, a movable clutch member selectively engageable with one of the worms for transmitting a torque thereto from a driving motor, and a solenoid for controlling the operation of the movable clutch member.

DESCRIPTION OF THE PREFERRED EMBODIMENTS

Figure 1:
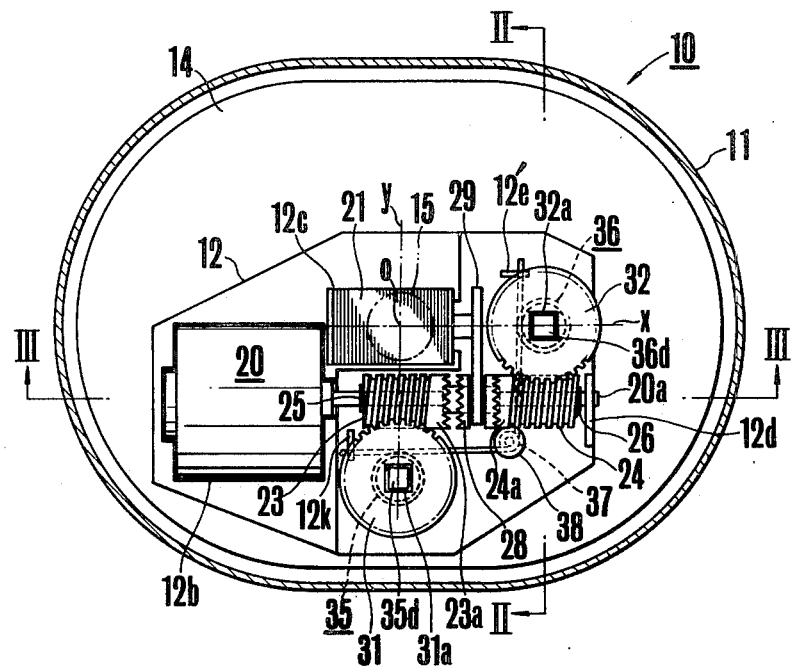
FIG. 1 is a back view of a mirror, with the mirror housing removed, showing one embodiment of the remotely controlled mirror embodying invention.

A preferred embodiment of the remotely controlled mirror 10 shown in FIGS. 1 through 5 comprises a mirror housing 11 secured to the fender of a vehicle, typically a motor car, by means of a suitable fastening means not shown. A base plate 12 is contained in the housing 11 and secured to the inner wall of the housing by suitable means. In the present embodiment, however, such means to secure the base plate 12 is omitted because it does not concern with the present invention. Various mirror drive elements to be described later are mounted on the base plate 12. A mirror 13 and a back plate 14 for supporting it are mounted to close the opposite opening of the housing. The back plate 14 is pivotally supported to the base plate by a supporting mechanism 15 which comprises a hemispherical portion 14a at the center of the rear side of the back plate 14, a socket member 12a projecting from the base plate 12 towards the openings of the mirror housing 11 and having a spherical surface adapted to receive the hemisphericalr portion, a screw 16 extending from the hemispherical portion 14a into the socket member 12a and having a head whose lower surface is machined to be spherical, a compression spring 17 and a nut 18 threaded on the inner end of the screw 16 for compressing the compression spring 17. The supporting mechanism 15 serves to assist the rotation of the mirror 13 and the back plate 14.

In this embodiment, the base plate 12 is made of a synthetic resin and in its surface opposite to the supporting member 12a are formed recesses 12b and 12c for receiving a reversible DC motor 20 and a solenoid coil 21 respectively which are fastened to the base plate 12 by suitable means, not shown.

Figure 3:
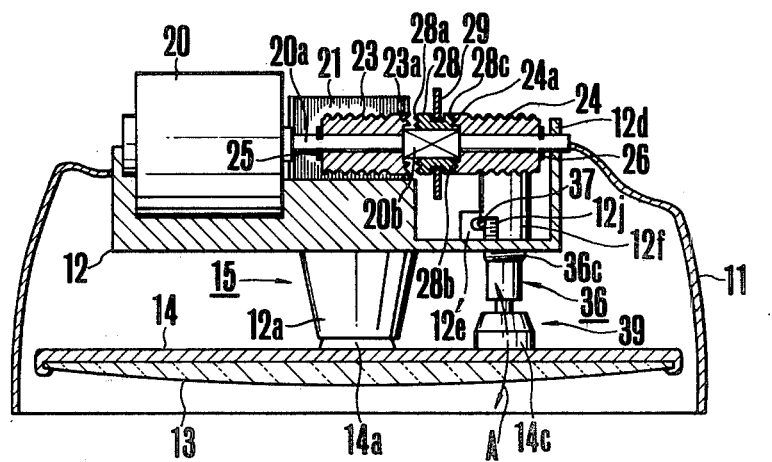
FIG. 3 is a sectional view taken along a line III—III in FIG. 1.

As shown in FIG. 3, the shaft 20a of the motor 20 extends to the right and its righthand end is rotatably supported by a upright wall 12d of the base plate 12. The motor shaft 20a is provided with square portion 20b at about the center and worms 23 and 24 are rotatably mounted on the motor shaft 20a on the opposite sides of the square portion 20b. The axial movement of the worms 23 and 24 are limited by snap rings 25 and 26 and the end surfaces of the square portion 20b.

A movable clutch member 28 is mounted on the square portion 20b to be movable on the axial direction. The clutch member 28 constitutes a clutch together with the end surfaces of the worms 23 and 24. Thus, clutch surfaces 28a and 28b are formed on the opposite surfaces of the clutch member 28 which face the end surfaces 23a and 24a of the worms 23 and 24 so that when either one of the worms engages the clutch member, a torque from the motor shaft 20a is transmitted to the worm.

As shown in FIG. 1 the free end of an operating member 29 which is secured at right angles to one end of the plunger 21a of the solenoid 21 engages the movable clutch member 28. This free end is bifurcated to engage a guide groove 28c formed on the periphery of the movable clutch member 28.

Figure 2:
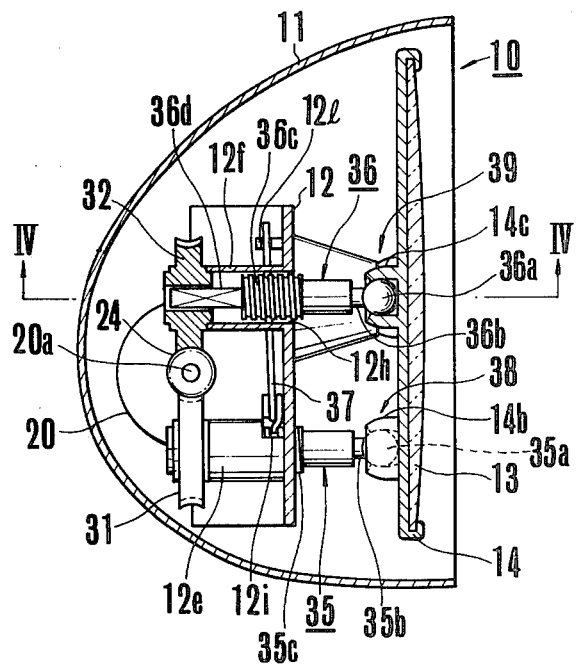
FIG. 2 is a sectional view taken along a line II—II in FIG. 1.
Figure 4:
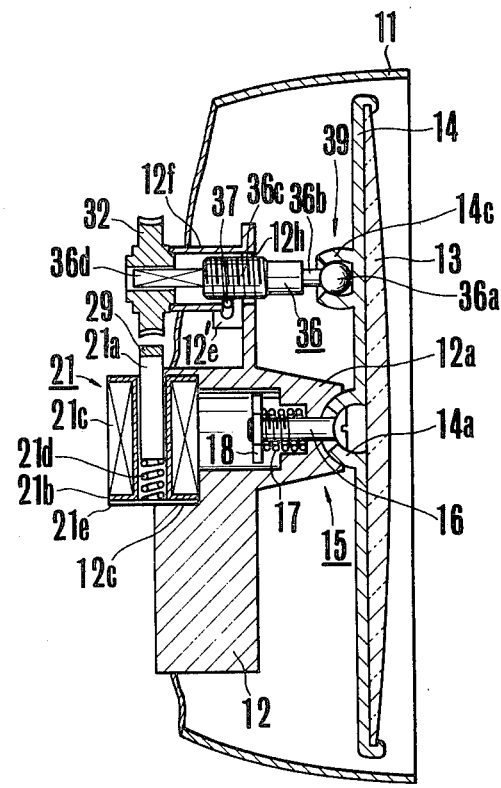
FIG. 4 is a sectional view taken along a line IV—IV in FIG. 2.

In addition to the plunger 21a, the solenoid 21 comprises a coil 21c wound on a bobbin 21b, a coil spring 21d for normally urging the plunger 21a toward upper as viewed in FIG. 4 and a supporting frame 21e. When the solenoid coil 21c is disenergized, the clutch surface 28b of the movable clutch member 28 engages the clutch surface 24a of the worm 24. Worm wheels 31 and 32 respectively meshing the worms 23 and 24 are disposed on the opposite sides of the motor shaft 20a. One sides of the worm wheels 31 and 32 are supported by the upper ends of supporting cylinders 12e and 12f respectively which are secured to the base plate 12 as shown in FIG. 2. The worm wheels 31 and 32 are provided with square openings 31a and 32a respectively at their centers for loosely receiving one ends of threaded rods 35 and 36. The opposite ends of these threaded rods 35, 36 extend through the supporting cylinders 12e and 12f and openings 12g and 12h (12g is not shown) provided for the base plate 12 toward the back plate 14 which supports the mirror 13. The righthand ends (as viewed in FIG. 4) of the threaded rods are tiltally and rotatally connected to the back plate 13 through ball and socket joints 38 and 39. The threaded rods 35 and 36 are connected to the back plate 14 at such points on the Y and X axes of rectangular coordinates having an origin O at the supporting mechanism 15 or the hemispherical portion 14a of the back plate 14.

The threaded rods 35 and 36 respectively comprise spherical members 35a, 36b of the ball and socket joints 38, 39; heads 35b, 36b; threaded portions 35c, 36c; and square portions 35d, 36d loosely fitted on the worm wheels 31, 32, respectively, and these members are integrally formed with a synthetic resin. The joints 38 and 39 are constituted by balls 35a, 36a and sockets 14b and 14c provided for the back plate 14.

Figure 5:
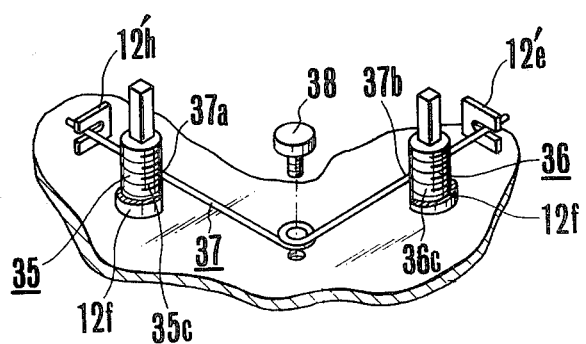
FIG. 5 is a partial perspective view showing the relationship between a spring, a threaded rod and a base plate utilized in the embodiment shown in FIGS. 1 through 4.

At the base portions of the supporting cylinders 12e and 12f are formed notches 12i and 12j through which portions of the threads 35c and 36c of the threaded rods 35 and 36 are exposed, and the opposite ends of a spring 37 engage these exposed portions. The spring 37 has a single turn at its center which surrounds a pin 38 secured to the base plate 12 so that the legs of the spring 37 are caused to engage definite points of the threads 35c and 36c by the force of the spring. In the mounted position, the spring 37 is bent into a letter L as shown in FIG. 5. The opposite ends of the spring are received by holders 12h' and 12e' integral with the base plate 12 so as to prevent the contact portions 37a, 37b of the spring 37 from moving in the vertical direction when the threaded rods 35 and 36 reciprocate or rotate. Similar object can also be accomplished by the notches 12i and 12j of the supporting cylinders 12e and 12f.

Gaps are provided between the worm wheels 31 and 32 and the square portions 35a and 36a of the threaded rods 35 and 36 for the following reasons. More particularly, when the mirror 13 is tilted about the supporting mechanism 15, the distance between the origin O and the respectice threaded rods 35 and 36 varies slightly. With reference to FIG. 3 the joint 39 of the threaded rod 36 moves along an arcuate path shown by an arrow A when the mirror 13 is tilted. Accordingly, the threaded rods 35 and 36 also tilt with respect to the base plate 12 thereby creating undue forces between the square portions 36a and the opening 32a of the worm wheel 32. For this reason, a gaps provided between these members so as to point the threaded rod 36 to incline without causing such undue force. For the same reason, a gap is also provided between the worm wheel 31 and the threaded rod 35.

Figure 6:
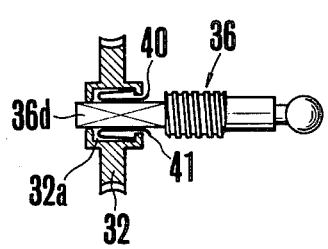
FIGS. 6 and 7 are sectional views showing two examples of a square portion of a threaded rod and a worm wheel.
Figure 7:
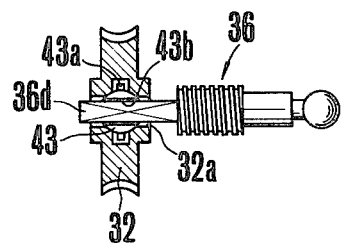

Similar gaps can also be provided by the modified constructions shown in FIGS. 6 and 7. In the construction shown in FIG. 6, four hair pin shaped springs 40 and 41 (only two of them are seen) are interposed between the opining 32a of the worm wheel 32 and the square portion 36d of the threaded rod 36. For the purpose of preventing dropping off of the hair pin springs flanges are formed on the opposite ends of the shaft opening 32a. In the modified construction shown in FIG. 7 a roller 43 having drop off preventing pins 43a is contained in the shaft opening 32a of the worm wheel 32 and the square portion 36a of the threaded rod 36 slidably extends through a square opening 43b of the roller 43.

Although not shown in the drawing, the inclination angle of the remotely controlled mirror described above is varied by the operation of a transfer switch located in front of the drivers seat of a motor car. The transfer switch is used to also control the connection of the motor 20 to the power source, the forward and reverse rotation of the motor, and energization and deenergization of the solenoid coil 21c. A motor for operating the transfer switch, the construction thereof and the connection of the solenoid coil are disclosed in said U.S. Pat. No. 3,978,735.

Above described remotely controlled mirror 10 operates as follows.

As first the solenoid coil 21c is not energized. Then, the motor 20 is started the forward direction to drive the threaded rod 36 via clutch 28, worm 24 and worm wheel 32. Since the spring 37 is engaging the thread of the threaded rod 36, the spring 37 acts as nuts so that the threaded rod 36 move in the axial direction relative to the base plate 12, the direction of movement being determined by the direction of rotation of the motor 20. More particularly, when the worm wheel 32 rotates in the clockwise direction as viewed in FIG. 1 the threaded rod 36 is moved to the rear side of the sheet of drawing whereas when the worm wheel 32 is rotated in the counterclockwise direction by reversing the rotation of the motor 20, the threaded rod 36 is moved to the front side. Accordingly, the mirror 13 would be tilted about the supporting mechanism 15 along X axis. Since there is a gap between the shaft opening 32a of the worm wheel 32 and the square portion 36d of the threaded rod 36 received therein, even when the mirror 13 is tilted and the socket 14c of the back plate 14 is moved along the arcuate path A as shown in FIG. 3, the gap absorbes the strain caused by the inclination of the threaded rod 32 with respect to the worm wheel 32 due to the arcuate motion. Where the motor 20 over runs, that is when the motor is operated beyond a predetermined limit of the inclination angle of the mirror, the rear surface of the back plate 14 would engage the pedestal 12a of the base plate 12, thus preventing further inclination. Under the conditions, since the leg of the spring 37 is caused to disengage the threads 36c of the threaded rod 36, the spring 37 would not operate as a nut, so that the threaded rod 36 is rotated at a difinite position. Accordingly, it is possible to prevent burn out of the motor 20 or the damage of the motion transmitting members. Similarly, when the mirror 13 is manually inclined without starting the motor 20, the leg of the spring 37 is caused to disengage the threads of the threaded rod there is no fear of damaging the motion transmitting members. Furthermore, since the spring 37 which engages the threaded rods 35, 36 is fixed to the base plate 12 it is possible to adjust the spring force to any desired value. As a result, it is possible to transmit a sufficiently large torque to the threaded rods 35, 36 from the worm wheels 31, 32.

When the solenoid coil 21c is energized the clutch member 28 is disengaged from the worm 24 and the clutch surface 28a of the clutch member 28 is caused to engage the clutch surface 23a of the worm 23. When the motor 20 is rotated again in the forward direction under these conditions, its rotation is transmitted to the other threaded rod 35 through the worm 23 and the worm wheel 31 in the same manner as above described so as to move the threaded rod 35 in a direction corresponding to the direction of rotation of the motor thereby inclining the mirror 13 along the Y axis.

Figure 8:
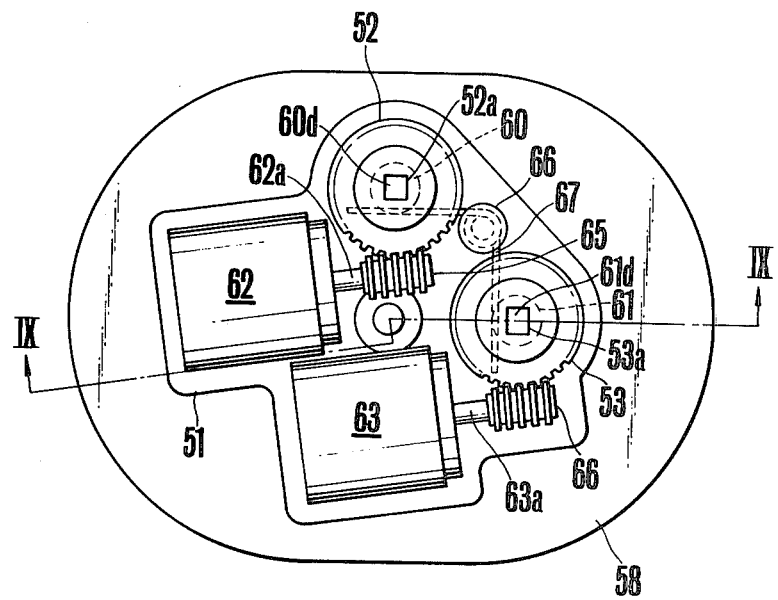
FIG. 8 is a rear view of another embodiment of the remotely controlled mirror of this invention wherein respective worm gears are driven by independent DC motors.
Figure 9:
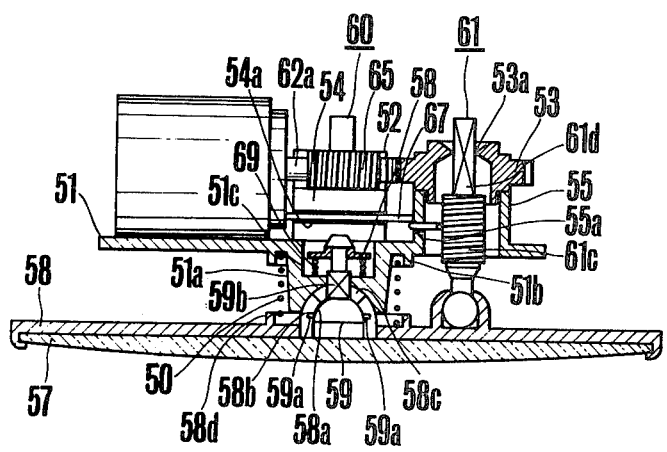
FIG. 9 is a sectional view taken along a line IX—IX in FIG. 8.

In the foregoing embodiment, a pair of threaded rods are driven by a single driving motor but as shown in FIGS. 8 and 9 the threaded rods may be driven by two independent direct current motors.

In FIGS. 8 and 9 only the elements contained in the mirror housing are shown. Like the previous embodiment, means for fastening the base plate 51 to the housing are not shown. Moreover, projections and recesses of the base plate only necessary to understand the invention are shown. In the modification shown in FIGS. 8 and 9, the base plate 51 is provided with supporting cylinders 54 and 55 adapted to support worm wheels 52 and 53 respectively, and threaded rods 60 and 61 which are rotatably and tiltably connected to a back plate 58 which supports a mirror 57 are respectively contained in the supporting cylinders 54 and 55. The constructions of the threaded rods and the ball socket joints of this modification are the same as those of the first embodiment.

Worm wheels 52 and 53 utilized in this modification are provided with square shaft openings 52a and 53a at their centers. These shaft openings 52a and 53a of these worm wheels 52 and 53 make a line contact with square portions 60d and 61d of the threaded rod 60 and 61. The portions other than those making said line contacts are provided with adequately large diameters to avoid the stress created between the square portion 60d, 61d and the worm wheels 52, 53 which is owing to inclination of the threaded rods due to inclination of the mirror. These worm wheels 52 and 53 mesh worms 65 and 66, respectively, which are connected to the shafts 62a and 63a of reversible DC motors 62 and 63 which are secured to the base plate 51. Slots 54a and 55a are formed through the base portions of respective supporting cylinders 54 and 55 for expossing portions of the threads 60c and 61c (60c is not seen) of the threaded rods 60 and 61 contained in the supporting cylinders 54 and 55. Opposite legs of a spring 67 having a single turn as its center which is secured to the base plate 51 by a pin 66 fit into the slots 60c and 61c to engage the threads of the threaded rods 60 and 61.

At the center of the back plate 58 is formed a spherical member 58a for receiving a stud 59. The spherical member 58a is provided with a guide 58b which guides a pin 59a adapted to permit inclination of the stud to the left and right but prevents its rotation, and an arcuate opening 58c which rotatably and tiltably receive a square portion 59b formed at a portion of the stud 59. A spring seat 58d for receiving one end of a coil spring 50 is provided to surround the spherical member 58a.

A pedestal 51a having a spherical member 58a is formed beneath the center of the base plate 51 and a spring seat 51b adapted to receive the upper end of the coil spring 50 is formed around the pedestal 51a. The pedestal 51a is formed with a recess 51c for receiving the upper end of the stud 59. The upper end of the stud 59 engages a disc 58, and a coil spring 69 is interposed between the disc and the bottom of the recess 51c. The supporting structure just described assists inclination of the mirror 59. With this construction it is possible to incline the mirror 57 in the directions of X and Y axes by simultaneously operating two driving motors 62 and 63. Of course, like the first embodiment, the two motors may be operated at different times. Again, gaps are provided between the shaft openings 52a and 53a of the worm wheels 52 and 53 and the square portions 60d and 61d of the threaded rods 60 and 61 respectively. Furthermore, the spring 67 cooperate with the threaded rods 60 and 61 in the same manner as the first embodiment.

Figure 10:
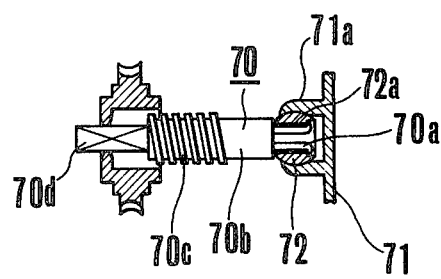
FIG. 10 is a sectional view showing another example of a connecting member between the threaded rod and the back plate shown in FIG. 8.

FIG. 10 shows a modification of the joints provided between the threaded rods 60 and 61 and the back plate 58 shown in FIGS. 8 and 9. A threaded rod 70 shown in FIG. 10 comprises a square portion 70d received in an opening of the worm wheel, threads 70c and a head 70b like the threaded rods 60 and 61 described above. However the joint between the threaded rod 70 and the back plate 71 has a slightly different construction. Thus, in this example, the end 70a of the head 70b comprises a hook divided into four sections each having a pawl. In the socket 71a on the rear side of the back plate 71 is rotatably contained a roller 72. The hook 70a is inserted into the opening 72a at the center of the roller 72 and the pawls are fitted into slots formed on one side of the roller. With this construction, when torque is transmitted to the threaded rod 70 from the worm wheel, the hook 72a rotates in the opening 702 so that the mirror is inclined with respect to the base plate as the threaded rod is rotated, and the roller 72 rotates inproportion to the degree of inclination of the mirror.

Figure 11:
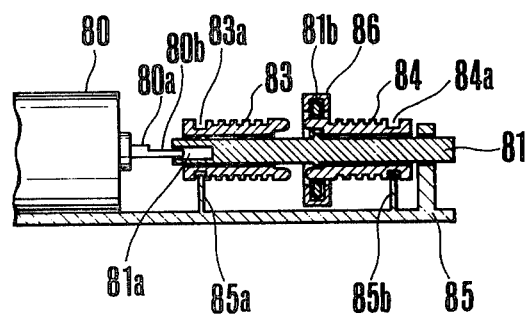
FIG. 11 is a sectional view showing still another example of the drive system of the worms utilized in the embodiment shown in FIGS. 1 through 5.
Figure 12:
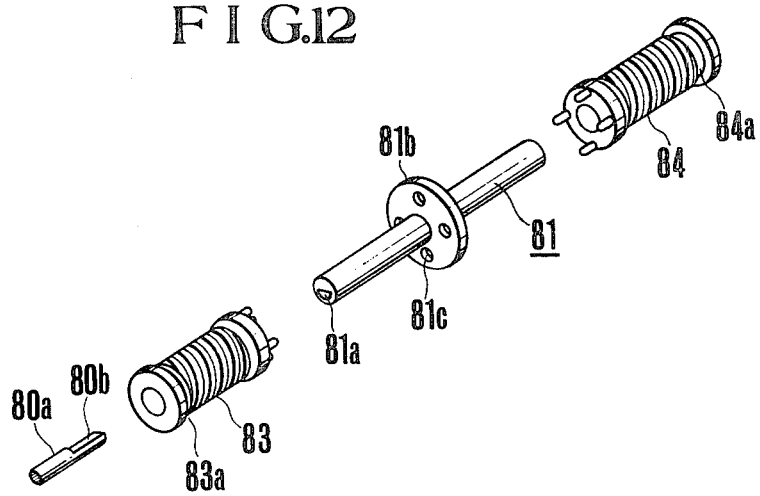
FIG. 12 is a perspective exploded view showing the principal elements of the drive system shown in FIG. 11.

FIGS. 11 and 12 show a modification of the driving means for the worm wheels shown in FIG. 1 through 5. In FIGS. 11 and 12, one end of the shaft 80a of a DC driving motor 80 corresponding to motor 20 described above is notched as at 80b which is slidably inserted into a relatively long opening 81a at one end of a shaft 81. Worms 83 and 84 corresponding to the worms 25 and 26 described above are rotatably mounted on shaft 81. On the remote ends of the worms 83 and 84 and provided guide grooves 83a and 84a for receiving supporting walls 85a and 85b integral with the base plate 85. The opposing ends of the worms 83 and 84 are formed with projections 83b and 84b which are selectively fitted into openings 81c of a flange 81b at the center of the shaft 81, thus forming a clutch. The flange 81b acting as a movable clutch member is shifted in the longitudinal direction of the shaft 81 by a rod 86 corresponding to operating rod 29 connected to the plunger 21a of solenoid 21.

With this modified construction it is not necessary to use a relatively long motor shaft as in the previous embodiment. Moreover, the construction of the clutch is simplified.

FIGS. 13 through 16 illustrate a further embodiment of the remotely controlled mirror of this invention. In this modification, a mirror housing 101 is secured to the fender of a motor car through a bracket (not shown) formed integraly with the bottom of the mirror housing. A base plate 102 is secured to the inside of the mirror housing 101 and forms a bracket and a casing to be described later. The base plate supports various elements to be described hereinafter. A mirror 103 is disposed to close the opening of the mirror housing 101. The mirror 103 is held by a back plate 104 and a spherical member 105a comprising a supporting member 105 is projected from the center of the back plate 104. The supporting member 105 holds the mirror 103 such that it can be tilted in any direction with respect to the base plate 102, and constituted by said spherical member 105a, a socket 105b receiving the same and a pedestal 105c integral with the base plate 102. The spherical member 105a is provided with projecting pins 106 which are received in vertical grooves 107 cut through the pedestal 105c so as to prevent the back plate 104 from rotating in the horizontal direction.

Figure 14:
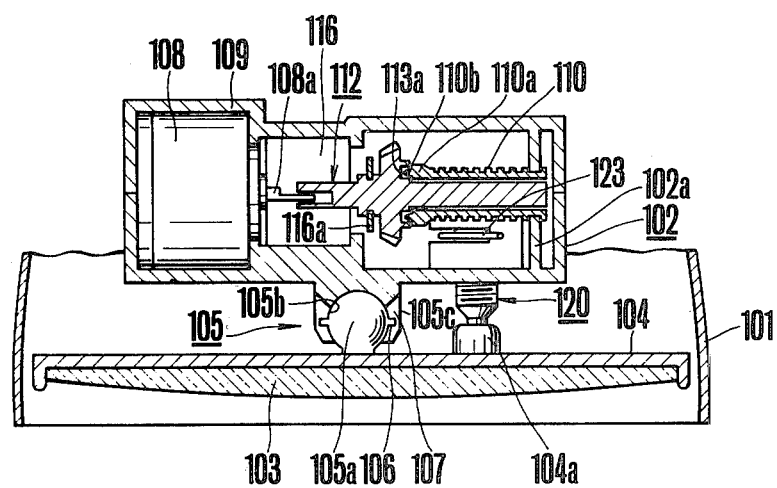
FIG. 14 is a sectional view taken along a line XIV—XIV in FIG. 13.

A driving motor 108 is secured to the base plate 102 by a bracket 109 for selectively driving worms 110 and 111. More particularly, the worm 110 is rotatably mounted on a shaft 112 which is connected to the motor shaft 108a to be slidable in the axial direction. A gear acting as a movable clutch member 113 is secured to an intermediate point of the shaft 112, as shown in FIG. 14 the movable clutch member 113 is caused to engage and disengage by the projections 110b provided for the stationary clutch member 110a and recesses 113a provided for the movable clutch member 113. When the clutch is engaged the worm 110 is coupled to the motor shaft 108a through shaft 112 whereas when the clutch is released, the worm 110 is disconnected from the motor shaft 108a.

Figure 13:
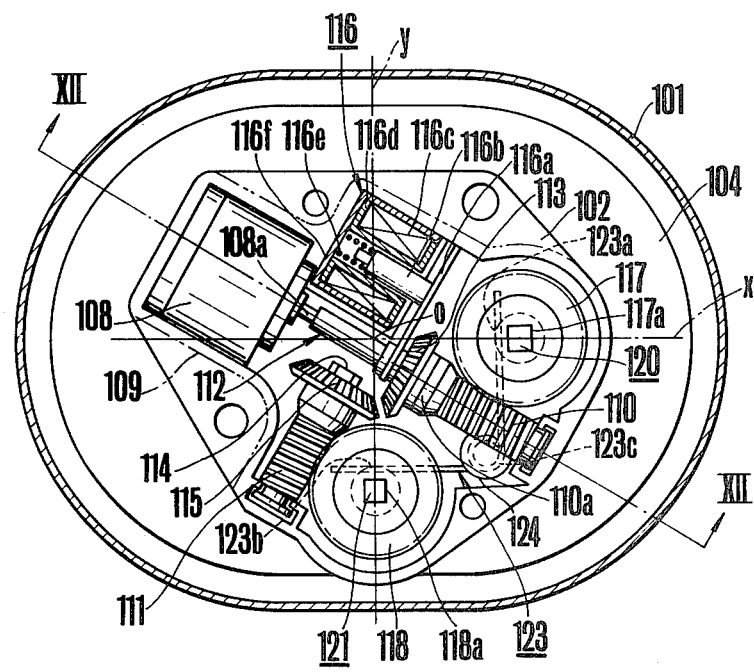
FIG. 13 is a back view showing still further embodiment of this invention, with certain portions removed and partly in section.
Figure 15:
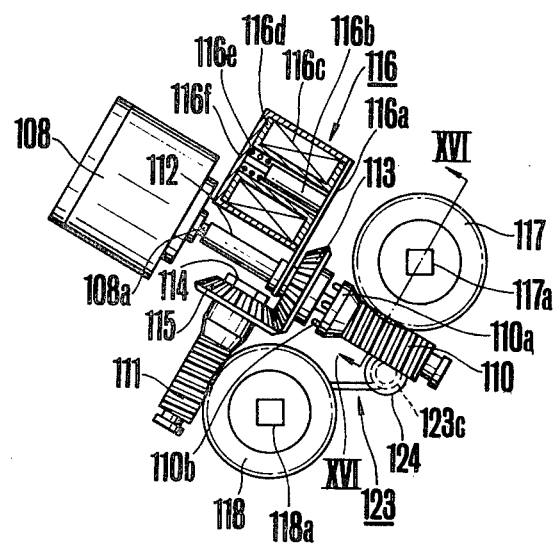
FIG. 15 is a back view showing certain elements shown in FIG. 13 in which the clutch of the mirror has been switched.

The worm 111 is rotatably mounted on a horizontal shaft 114 supported by the base plate 102. A stationary clutch member in the form of a bevel gear 115 secured to one end of the worm 111 cooperates with the movable clutch member 113. Consequently, when the stationary and movable clutch members 114 and 113 are out of engagement, as shown in FIG. 13 the rotation of the motor 108 is not transmitted to the worm 111, whereas when they engage each other as shown in FIG. 15, the rotation of the motor 108 is transmitted to the worm 111.

A solenoid 116 is provided to actuate the movable clutch member 113 so as to selectively couple either one of the worms 110 and 111 to the motor shaft 108a. The solenoid 116 comprises an operating lever 116a with its outer end engaged with the movable clutch member 113, a plunger 116b connected to the operating lever 116a, a coil 116c wound on a bobbin 116d, a compression spring 116e and a supporting frame 116f. The solenoid 116 is secured to the base plate 102 by a stay not shown.

Figure 16:
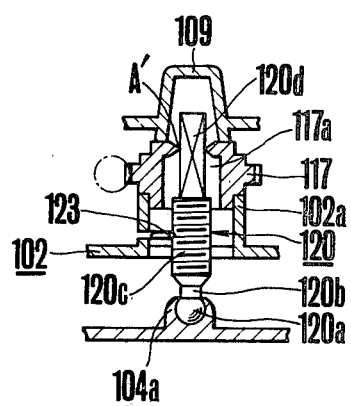
FIG. 16 is a sectional view taken along a line XVI—XVI in FIG. 15.

The worms 110 and 111 mesh with worm wheels 117 and 118 respectively for rotating threaded rods to be described later. The worm wheels are rotatably supported between supporting cylinders 102a and 102b (which is not shown) extending from the base plate 102 and the bracket 109. These worm wheels 117 and 118 are provided with square openings 117a and 118a respectively which slidable but not rotatably receive square portions formed at the upper ends of the threaded rods to be described later. Annular projection on the inner walls of the worm wheels 117 and 118 make line contacts with the square portions 120d as at A', as shown in FIG. 16 portions of the threaded rods 120 and 121 other than the square portion 120d are constructed to have a sufficiently large diameter so as to prevent application of any stress between the square portions and the worm wheels when the threaded rods are inclined due to the inclination of the mirror. One ends of the threaded rods 120 and 121 are connected to the back of the back plate by universal joints and the supporting member 105 of the threaded rods is portioned on the X any Y axies which intersect at right angles at the origin O. Since threaded rods 120 and 121 have the same construction, the construction of one threaded rod 120 with the described with reference to FIG. 16.

More particularly, the threaded rod 120 comprises a ball 120a, a neck 120b, a threaded portion 120c, and a square portion 120d received in the opening 117a of the worm wheel 117. THe ball 120a is received in a socket 104a integrally formed on the back of the back plate 104 so as to form a universal joint.

A spring 123 is provided which engages the threads of the threaded rods 120 and 121. The spring 123 is secured to the base plate 102 such that its legs 123a and 123b urge against the threads 120c and 121c of the threaded rods by the resiliency of the spring. The spring is secured to the base plate 102 by a pin 124 engaging a single turn at the center of the spring.

Again the remotely controlled mirror is operated by a transfer switch installed near the drives seat. Thus, the transfer switch controlls the ON, OFF and direction of rotation of the driving motor 108 and the energization and disenergization of the solenoid 116 so as to incline the mirror in a desired direction.

Consequently, when the motor 108 is driven while the solenoid 116 is maintained in the disenergized state, the rotation of the motor shaft 108a is transmitted to the threaded rod 120 via movable clutch member 113, worm 110 and worm wheel 117. Since the spring 123 engages the threads of the threaded rod, when it rotates the spring acts as a nut so that the threaded rod 120 moves in the axial direction with respect to the base plate 102. More particularly, as the worm wheel 117 rotates in the clockwise or counterclockwise direction as viewed in FIG. 13, the threaded rod 120 moves downwardly or upwardly. Accordingly, the mirror 103 is tilted about the supporting member 105. An the other hand, when the solenoid 116 is energized, the coupling between the movable clutch member 113 and the worm 110 is released and the movable clutch member 113 is coupled to the worm 111 via the stationary clutch member 115. Accordingly, when the motor 108 is energized, its rotation is transmitted to the other threaded rod 121 via worm 111 and worm wheel 118 to axially move the threaded rod 121 for inclining the mirror in a direction corresponding to the direction of rotation of the motor 108.

When the motor 108 overruns, that is when the mirror is inclined beyond a predetermined limit, the rear surface of the back plate 104 comes to engage the pedestal 105c of the base plate 102 thus preventing further inclination of the mirror. Under these conditions, as the legs of the spring are caused to disengage the threads of the threaded rods 120 (121), the spring no more functions as a nut, so that the threaded rods rotates at a fixed position whereby burn out and damage of the motion transmission members can be prevented. Similarly, when the the mirror 103 is manually inclined without using the motor the legs of the spring is caused to disengage the threads of the threaded rods so that it is possible to incline the mirror by any desired angle without damaging the motion transmitting members. Furthermore, as this modification is constructed such that any stress caused by the inclination of the mirror would not be applied to the couplings between the worm wheels 117 and 118 and the threaded rods 120 and 121.

Figure 17:
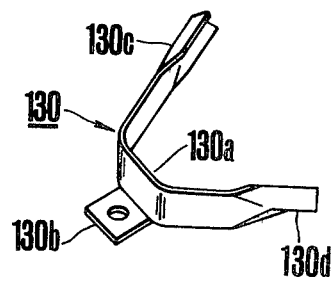
FIG. 17 is a perspective view showing another example of the sparing which engages the threaded rod utilized in this invention.

It should be understood that the invention is never limited to the specific embodiments described above, and that various modifications may be made. For example, although the spring was used in common to a pair of threaded rods, independent wire springs may be used for respective threaded rods. In this case, one end of each spring is fixed to the base plate while the other end is caused to urge against the threads of the threaded rod. Alternatively, the spring may be made of a metal strip as shown in FIG. 17. The leaf spring 130 takes generally U shape and a tab 130b for securing the spring is provided for the bottom portion 130a. The edges of each leg are bent to have a V shaped cross-sectional configuration so as to form end portions 130c and 130d adapted to engage the threads of the threaded rods.

Although not shown, in the embodiments shown in FIGS. 1-5 and FIGS. 8-9 supporting cylinders may be provided above respective worm wheels for preventing dropping thereof. For example, a cover for covering the base may be provided.

What is claimed is:

1. A remotely controlled mirror comprising a stationary base plate contained in a mirror housing; a back plate provided at the back of a mirror and provided with a supporting mechanism that can tilt in any direction with respect to said base plate; a pair of threaded rods with one ends rotatably and tiltably connected to said base plate; spring means with one end thereof being supported by said base plate and engaging with the threads of said threaded rods while the other end being free, thereby controlling axial movements thereof; means for limiting the axial movement of the spring means that is caused by the rotation of the threaded rods engaging with the spring member; a pair of worm wheels respectively having openings for receiving the other ends of said threaded rods; a pair of worms meshing said worm wheels respectively; and a source of drive for selectively rotating said worms; the openings of said worm wheels and the other ends of said threaded rods being constructed such that it is possible to transmit a torque there between but absorb stresses caused by the inclination of said mirror and acting between said worms and said worm wheels, and said threaded rods being rotated and moved in the axial direction with respect to said spring means by the torque applied thereto from said source of drive through said worm wheels.

2. A remotely controlled mirror according to claim 1 wherein said spring means comprising a wire spring having a central portion would into a single turn which is used to secure the spring means to said base portion and intermediate portions engaging the threads of said threaded rods.

3. A remotely controlled mirror according to claim 1 wherein said spring means comprises a leaf spring which is bent into a generally U shape and provided with a tab at the base for securing spring means to said base plate, and the edges of the opposite ends of said leaf spring are bent into V shape cross-sectional configuration which engage the threads of said threaded rods.

4. A remotely controlled mirror according to claim 1 wherein said source of drive comprises a pair of independent reversible direct current motors for selectively driving said worms.

5. A remotely controlled mirror according to claim 1 wherein said source of drive comprises a single reversible direct current motor and a relatively long drive shaft extending from the motor and provided with a square portion at an intermediate portion, said worms are located on the opposite sides of said square portion, members for controlling the axial movement of said worms are mounted shafts on the outside of said worms, an axially slidable clutch member is mounted on said square portion, the end surfaces of said clutch member form clutches together with the opposing end surfaces of said worms, and wherein a solenoid is energized, said axially movable clutch member engages either one of said worms.

6. A remotely controlled mirror according to claim 1 wherein said source of drive comprises a single reversible direct current motor, and a shaft coupled to said motor to be slidable in the axial direction, said shaft being provided with a flange at about the axial center, said worms being disposed on the opposite sides of said flange and supported not to be rotatable with respect to said base plate, said flange being provided with a number of openings around its periphery, the side surfaces of said worms facing said flange being provided a plurality of projections adapted to be received in said openings, and wherein said flange is operated by a plunger of a solenoid so that when said solenoid with the projections of either one of said worms.

7. A remotely controlled mirror comprising a stationary base plate contained in a mirror housing; a back plate provided at the back of a mirror and provided with a supporting mechanism that can tilt in any direction with respect to said base plate; a pair of threaded rods extending along the axes of rectangular coordinates having an origin at said supporting nechanism, one ends of said threaded rods being tiltably supported by said base plate; a spring member having a central portion fixed to said base plate and a pair of legs adapted to engage the threads of said threaded rods for applying spring force thereto so as to control the axial movement of said threaded rods when they are rotated; means for limiting the axial movement of the spring means that is caused by the rotation of the threaded rods engaging with the spring member; two worm wheels respectively having openings to receive the other ends of said threaded rods; worms respectively meshing said worm wheels, and a source of drive for selectively driving said worms, the openings of said worm wheels and said other ends of said threaded rods being shaped such that torques can be transmitted therebetween but can prevent creation of stress between said worm wheels and said other ends of said threaded rods when said mirror is inclined so that said threaded rods one rotated and moved in the axial direction by the rotation of said worm wheels.

8. A remotely controlled mirror according to claim 7 wherein each of said threaded rods comprises a square portion, a threaded portion, a neck and a spherical portion formed in the order mentioned, said square portion is received in a square opening of said worm wheel, said spherical portion forms a universal joint together with a socket provided for said back plate, and said threaded portion being engaged by said spring member.

9. A remotely controlled mirror according to claim 8 which further comprises a hair pin spring interposed between the side walls of said square opening of said worm wheel and the square portion of each threaded rod.

10. A remotely controlled mirror according to claim 8 which further comprises a roller having falling down preventing pin and contained in the opening of each worm wheel and said roller is provided with a square opening for slidably receiving the square portion of each one of said threaded rods.

11. A remotely controlled mirror according to claim 7 wherein each threaded rod comprises a square portion, a threaded portion, a neck, and a plurality of hooks which are arranged in the order mentioned, said square portion being loosely received in a square opening of each worm wheel, and each hook being received in a through opening of a rotary member rotatably received in a socket provided for said back plate.

12. A remotely controlled mirror accotding to claim 7 which further comprises supporting cylinders mounted on said base plate for supporting said worm wheels said supporting cylinders being provided with slots through which said spring member engages the threads of said threaded rods for constituting means for preventing axial movement thereof when the threaded rods are rotated.

13. A remotely controlled mirror according to claim 12 wherein said means for preventing axial movement comprises holders secured to said base plate for holding the opposite ends of said spring member.

14. A remotely controlled mirror according to claim 7 wherein there is provided a gap between each side wall of said worm wheels and each end of said threaded rods.

15. A remotely controlled mirror according to claim 7 wherein the inner walls of the opening of said worm wheels make line contacts with said threaded rods thus absorbing stresses therebetween.

16. A remotely controlled mirror comprising a stationary base plate contained in a mirror housing, a back plate provided at the back of a mirror and provided with a supporting mechanism that can tilt in any direction with respect to said base plate; a pair of threaded rods with one ends rotatably and tiltably connected to said plate and extending along X and Y axes of rectangular coordinates having an origin at said supporting mechanism; a spring member having a central portion secured to said base plate and the opposite ends engages the threads of said threaded rods thus applying a spring force thereto, means for preventing an axial movement of said threaded rods when they are rotated; a pair of worm wheels respectively having openings for receiving the other ends of said threaded rods; worms disposed at right angles and respectively meshing said worm wheels; a movable clutch member selectively engageable with one of said worms for transmitting a torque thereto from a driving motor, and a solenoid for controlling the operation of said movable clutch member.

* * * * *

UNITED STATES PATENT AND TRADEMARK OFFICE
CERTIFICATE OF CORRECTION

PATENT NO. : 4,202,603
DATED : May 13, 1980
INVENTOR(S) : Shizuya Miyauchi

It is certified that error appears in the above-identified patent and that said Letters Patent are hereby corrected as shown below:

Col. 1, line 11, Change "vehicles" to -- vehicle -- ;
Col. 1, line 14, change "vehicles" to -- vehicle -- ;
Col. 1, line 19, change "off" to -- out of -- ;
Col. 5, line 66, change "respectice" to -- respective -- ;
Col. 6, line 14, change "opining" to -- opening -- ;
Col. 8, line 43, change "72a" to -- 70a -- ;
Col. 8, line 43, change "702" to -- 72a -- ;
Col. 10, line 31, change "drives" to -- drivers -- ;
Col. 10, line 48, change "an" to -- on --;
Col. 12, line 42, change "nechanism" to -- mechanism --;
Col. 13, line 23, change "accotding" to -- according -- ;

Signed and Sealed this

Seventh Day of October 1980

[SEAL]

Attest:

SIDNEY A. DIAMOND

Attesting Officer

Commissioner of Patents and Trademark